(12) United States Patent
Van Dieren et al.

(10) Patent No.: US 8,991,301 B2
(45) Date of Patent: Mar. 31, 2015

(54) DEVICE FOR SOFTENING GRAIN

(75) Inventors: Bernardus Van Dieren, Oedenrode (NL); Gerardus Toonen, Hubert (NL)

(73) Assignee: Buehler AG, Uzwil (CH)

( * ) Notice: Subject to any disclaimer, the term of this patent is extended or adjusted under 35 U.S.C. 154(b) by 1452 days.

(21) Appl. No.: 10/598,253

(22) PCT Filed: Mar. 1, 2005

(86) PCT No.: PCT/CH2005/000116
§ 371 (c)(1),
(2), (4) Date: Aug. 22, 2006

(87) PCT Pub. No.: WO2005/083050
PCT Pub. Date: Sep. 9, 2005

(65) Prior Publication Data
US 2007/0160710 A1    Jul. 12, 2007

(30) Foreign Application Priority Data

Mar. 1, 2004  (NL) ..................................... 1025609

(51) Int. Cl.
| C12C 7/06 | (2006.01) |
| C12C 1/027 | (2006.01) |
| C12C 1/02 | (2006.01) |
| C12C 1/15 | (2006.01) |

(52) U.S. Cl.
CPC ................. C12C 1/0275 (2013.01); C12C 1/02 (2013.01); C12C 1/15 (2013.01)
USPC ............. 99/276; 99/277.1; 99/277.2; 99/278; 426/11; 426/16; 426/28; 426/29; 426/64; 426/93; 426/291.2; 426/592; 426/600

(58) Field of Classification Search
CPC .......... C12C 1/02; C12C 1/0275; C12C 1/15; C12C 7/00
USPC .............. 99/276, 278, 277.1, 277.2; 239/548, 239/565–567; 435/291.1–8, 93, 291.2; 426/11, 16, 28–29, 64, 93, 291.2, 592, 426/600
See application file for complete search history.

(56) References Cited

U.S. PATENT DOCUMENTS

| 12,204 | A | * | 1/1855 | Hammer | ......................... 99/278 |
| 23,266 | A | * | 3/1859 | Rollin | ............................ 426/431 |
| 56,453 | A | * | 7/1866 | Schneider | ...................... 426/592 |

(Continued)

FOREIGN PATENT DOCUMENTS

| DE | 01917972 | 11/1969 |
| DE | 1517789 | 12/1969 |

(Continued)

OTHER PUBLICATIONS double-floor definition, http://www.answers.com/topic/double-floor.*

(Continued)

*Primary Examiner* — Brett Spurlock
(74) *Attorney, Agent, or Firm* — Greenblum & Bernstein, P.L.C.

(57) ABSTRACT

A device for steeping barley having a container for containing the barley to be steeped. The container has a floor and the floor has passageways for flowing at least one of steeping water and gases through the passageways. The device further includes a water line system under the floor directly connected to the passageways.

27 Claims, 3 Drawing Sheets

(56) References Cited

U.S. PATENT DOCUMENTS

| | | | | |
|---|---|---|---|---|
| 206,010 | A * | 7/1878 | Foubert | 126/374.1 |
| 395,468 | A * | 1/1889 | Whitney | 435/291.3 |
| 409,956 | A * | 8/1889 | Gent | 435/291.4 |
| 758,451 | A * | 4/1904 | Judelson | 211/123 |
| 1,460,486 | A * | 7/1923 | Harvey | 99/345 |
| 1,563,850 | A * | 12/1925 | Hartman | 210/127 |
| 1,921,231 | A * | 8/1933 | Jourdan | 99/346 |
| 2,138,051 | A * | 11/1938 | Williams | 366/113 |
| 2,296,166 | A * | 9/1942 | Klein | 99/494 |
| 2,500,775 | A * | 3/1950 | Stewart | 165/250 |
| 2,701,422 | A * | 2/1955 | Wesson et al. | 34/109 |
| 2,767,021 | A * | 10/1956 | Nelson | 239/247 |
| 2,948,661 | A * | 8/1960 | O'Neill, Jr. | 435/286.5 |
| 2,961,316 | A * | 11/1960 | Cook et al. | 426/30 |
| 3,013,949 | A * | 12/1961 | Ostertag | 435/291.5 |
| 3,033,762 | A * | 5/1962 | Schwaiger et al. | 435/291.6 |
| 3,085,012 | A * | 4/1963 | Truman | 34/287 |
| 3,120,015 | A * | 2/1964 | MacChesney | 15/3.5 |
| 3,224,362 | A * | 12/1965 | Kozar | 99/346 |
| RE26,177 | E * | 3/1967 | Deutsch | 60/202 |
| 3,383,290 | A * | 5/1968 | Vilain | 435/185 |
| 3,521,304 | A * | 7/1970 | Ghiz | 4/490 |
| 3,647,473 | A * | 3/1972 | Stowell et al. | 426/29 |
| 3,730,845 | A | 5/1973 | Schultz | |
| 3,730,846 | A * | 5/1973 | Neubert | 435/291.3 |
| 3,746,550 | A * | 7/1973 | Ehnstrom | 426/30 |
| 3,796,143 | A * | 3/1974 | Schlimme et al. | 99/277.2 |
| 3,814,003 | A * | 6/1974 | Vacano | 99/276 |
| 3,834,296 | A * | 9/1974 | Kehse et al. | 99/276 |
| 3,840,435 | A * | 10/1974 | Damon | 435/291.5 |
| 3,849,255 | A * | 11/1974 | Schlimme et al. | 435/291.3 |
| 3,853,713 | A * | 12/1974 | Colclough | 435/291.8 |
| 3,940,807 | A * | 3/1976 | Baker et al. | 4/490 |
| 3,962,478 | A * | 6/1976 | Hohlbein et al. | 426/495 |
| 4,029,116 | A * | 6/1977 | Beyer | 134/167 R |
| 4,048,019 | A * | 9/1977 | Numberger | 435/291.1 |
| 4,115,878 | A * | 9/1978 | Johnson et al. | 4/492 |
| 4,181,743 | A * | 1/1980 | Brumlick et al. | 426/241 |
| 4,277,505 | A * | 7/1981 | Simpson | 426/64 |
| 4,286,065 | A * | 8/1981 | Kaluniants et al. | 435/294.1 |
| 4,304,176 | A * | 12/1981 | Redl | 99/276 |
| 4,315,380 | A * | 2/1982 | Davidson | 47/58.1 R |
| 4,327,631 | A * | 5/1982 | Smith et al. | 99/277.2 |
| 4,361,080 | A * | 11/1982 | Smith et al. | 99/277.1 |
| 4,378,434 | A * | 3/1983 | Prentice et al. | 435/157 |
| 4,494,451 | A * | 1/1985 | Hickey | 99/276 |
| 4,542,682 | A * | 9/1985 | Hancock | 99/277.1 |
| 4,545,137 | A * | 10/1985 | Amelung et al. | 34/233 |
| 4,592,505 | A * | 6/1986 | Bruninga et al. | 239/69 |
| 4,659,662 | A * | 4/1987 | Hsu | 435/161 |
| 4,767,715 | A * | 8/1988 | Andreasen | 435/291.2 |
| 4,837,156 | A * | 6/1989 | Lampinen | 435/291.2 |
| 4,886,759 | A * | 12/1989 | Andreasen | 435/291.2 |
| 4,982,511 | A * | 1/1991 | Frei | 34/393 |
| 5,202,263 | A * | 4/1993 | Becker et al. | 435/291.6 |
| 5,282,413 | A * | 2/1994 | Sauvage et al. | 99/278 |
| 5,644,971 | A * | 7/1997 | Ward | 99/278 |
| 5,676,039 | A * | 10/1997 | Wedding et al. | 99/276 |
| 5,682,628 | A * | 11/1997 | Oleson | 4/591 |
| 5,778,762 | A * | 7/1998 | Stippler et al. | 99/276 |
| 6,244,224 | B1 * | 6/2001 | Witter | 122/235.14 |
| 6,251,466 | B1 * | 6/2001 | McGuire et al. | 426/577 |
| 6,419,840 | B1 * | 7/2002 | Meincke | 210/767 |
| 6,554,011 | B1 * | 4/2003 | Bischoff et al. | 134/172 |
| 6,620,614 | B1 * | 9/2003 | Luth et al. | 435/291.3 |
| 6,703,055 | B1 * | 3/2004 | Klein et al. | 426/11 |
| 6,730,774 | B1 * | 5/2004 | Christel et al. | 528/500 |
| 6,739,469 | B1 * | 5/2004 | Kim | 220/4.12 |
| 6,817,043 | B2 * | 11/2004 | Zars | 4/504 |
| 8,141,477 | B2 * | 3/2012 | Broderick | 99/276 |
| 2005/0059141 | A1 * | 3/2005 | Wismar | 435/289.1 |
| 2006/0134776 | A1 * | 6/2006 | Swinkels | 435/291.3 |

FOREIGN PATENT DOCUMENTS

| | | |
|---|---|---|
| DE | 1642651 | 10/1972 |
| DE | 2523709 | 12/1976 |
| EP | 0141907 | 5/1985 |
| EP | 0471143 | 2/1992 |
| EP | 0714979 | 6/1996 |
| GB | 1538177 | 1/1979 |

OTHER PUBLICATIONS sieve definition, http://dictionary.reference.com/browse/sieve.*
"Brewing Technology," 1st Ed., Compiled by Guoxian, Publishing House of China Light Industries (Dec. 31, 1996) {English Language Translation of Relevant Portion).
Brazilian Office Action conducted in counterpart Brazil Appln. No. PI0508257-9 (Jul. 29, 2014) (w/ English language translation of pertinent parts of Office Action).

* cited by examiner

DEVICE FOR SOFTENING GRAIN

CROSS REFERENCE TO RELATED APPLICATIONS

The present application is a National Stage Application of International Application No. PCT/CH2005/000116 filed Mar. 1, 2005, which published as WO 2005/083050 on Sep. 9, 2005, the disclosure of which is expressly incorporated by reference herein in its entirety. Further, the present application claims priority under 35 U.S.C. §119 and §365 of Netherland Application No. 1025609 filed Mar. 1, 2004.

BACKGROUND OF THE INVENTION

1. Field of the Invention

This invention relates to a container for barley to be steeped, with a floor that is provided with passageways for passing water between the underside of the floor and the barley to be steeped in the container.

2. Background Description

As known to the expert, brewing beer requires that barley be cleaned and steeped prior to the malting process, wherein the barley grains are moved to more or less of an extent in order to germinate. Known here is the use of a so-called steeping cistern provided with a double, flat floor. The top floor of the double floor is here perforated, wherein the perforated passageways are small enough to prevent barley grains brought from above onto the top floor of the double floor from passing through these perforated passageways. The distance between the two floors of the double floor normally measures at least about 80 cm.

While the barley is cleaned and steeped in the known steeping cistern, the barley is introduced into the cistern on the top floor of the double floor. In the steeping cistern, the barley is subjected to a treatment primarily involving two alternating and repeating phases. During the first phase, the barley is supplied with water via the double floor, wherein not just the barley, but also the dual floor is submerged under the water. Also referred to as the wet steeping phase, this phase typically lasts about 2 to 5 hours. In the second phase that follows the wet steeping phase, which is also referred to as dry steeping phase, and generally lasts for about 10 hours, the water is drained from the steeping cistern, wherein the water that was above the first floor of the double floor during the wet steeping phase flows through the perforations in the top floor of the double floor.

During the steeping process, the moisture content in the (living) grains increases, thereby accelerating the conversions into the grains necessary for sustaining life. In these conversions, starch compounds are enzymatically converted in water and carbon dioxide, for which purpose oxygen is additionally needed from the environment. During the wet steeping phase, the water is aerated to supply oxygen and expel carbon dioxide. In the dry steeping phase, the air between the grains is freshened through aeration, which expels carbon dioxide and supplies oxygen.

One important objection associated with using a flat steeping cistern with a double floor is the significant level of water consumption, since the double floor is of necessity filled with water during the wet steeping phase. The typical quantities that here play a role fill the double floor with about 300 $m^3$ of water (rule of thumb: about 0.7 m3 per $m^2$ of steeping cistern surface), wherein about 450 $m^3$ of water is present above the top floor of the double floor during the wet steeping phase (rule of thumb: about 1 $m^3$ per ton of barley). There are only a limited number of options for reducing the height of the double floor, since a minimum height is required to evacuate a sufficient amount of carbon dioxide from the mass of barley grains during the steeping phase. Another important objection associated with the use of known flat steeping cisterns is that cleaning it when no barley grains are present in the flat steeping cistern is very time consuming and work intensive, and there is a risk that contaminants will nonetheless remain behind, an undesirable prospect given the type of end product, specifically beer.

SUMMARY OF THE INVENTION

The invention now intends to offer a solution, or at least improvement, for the set of problems described above. To this end, the device according to the invention is characterized in that a water line network under the floor is directly adjacent to passageways in order to pass water through these passageways. Using such a water line network eliminates the necessity of using a double floor, which must be filled with water during the wet steeping phase. As a result, a significant savings in water consumption can be realized.

In order to expand the functionality of the water line network, it is preferred that the water line network be set up for diverting water via the passageways starting at the barley to be steeped.

As an alternative or in combination, it is preferred that the water line network be set up for supplying water via the passageways to the barley to be steeped through the passageways starting at the underside of the floor.

To keep the water line network relatively simple in design, it is desirable to limit the number of passageways through which water is passed from or to the barley to be steeped, making it necessary to provide the passageways with a traversable surface that is significantly larger than the traversable surface of the perforation passageways in the top floor of the double floor of the flat steeping cistern according to prior art. In this case, passageways with a traversable surface of at least 50 $cm^2$, and further of at least 100 $cm^2$, are preferred. In order to now prevent barley grains from passing through these passageways, the passageways should preferably be provided with sieve units.

The container preferably has a round head shape in the top view, wherein the passageways are arranged in radially oriented rows. The advantages associated with this are primarily structural in nature.

In order to subject the barley grains in the container to the action of the water supplied through the passageways as homogeneously as possible, it is preferred that the passageways be distributed over the surface of the floor in a primarily uniform fashion. This general rule might be less applicable, if at all, near the circumferential edge given the deviating behavior near the circumferential edges of the floor. In addition, the advantage to a uniform distribution of passageways over the surface of the floor is that, as will be explained further on, if these passageways are also used for aerating the barley grains, the barley grains can be set in motion with a minimum number of passageways, thereby generating a growing, dirt-removing and pressure-compensating effect. The barley grains will pass straight through the passageways perpendicularly upward, while a downwardly flowing stream of barley grains is obtained at some radial distance between the passageways, for example at a radial distance of between 20 and 50 centimeters, thereby yielding a more or less toroidal pattern of motion, wherein the barley grains are continuously circulated. This pattern of motion is also referred to as a recirculating effect. As already mentioned, the number of passageways must here be limited, wherein a compromise must be found between the traversable surface of the passageways, the density of passageways on the floor, and the recirculating effect. The density of the passageways on the floor is preferably less than 10, or more preferably less than 5 passageways per m². In order to achieve the homogeneous distribution during the use of radially oriented rows as effectively as possible, even near the midpoint of the round head shape, it is preferred that adjacent, radially oriented rows vary in length.

It is very preferred that the water line network under the floor be provided with a series of shared water line elements, and with water branch line elements, between a shared water line element and a passageway. This limits the tube length required for the water line network.

When using radially oriented rows of passageways, it is preferred that the shared water line elements be radially oriented, so that the orientation of rows, passageways and shared water line elements coincide, and the water branch line elements in between can be essentially uniform in design.

It is here further preferred that the shared water line elements be arranged between two adjacent radially oriented rows of passageways viewed from above, so that the water branch line elements can be connected right next to the passageways of the two adjacent, radially oriented rows at one end, and right next to the same shared water line element at their opposite end.

In order to also limit the tube length necessary for the water line network, it is further preferred that a number of shared water line elements be connected to a water main line element.

One important advantage in terms of the simplicity with which the device can be cleaned in the interim is achieved by providing a container for cleaning agents that is connected by a cleaning agent valve with the water line network, so that cleaning agents can be added to the water line network when desired. It must here be kept in mind that the amount of water the water line system can hold is many times less than the volume of the double floor of the flat steeping cistern according to prior art. As already mentioned, the latter volume usually measures 300 m³, while a typical volume for the inside of the water line system measures 5 m³, so that the application of a container for cleaning agents with which the so-called clean-in-place process can be performed lies within the realm of possibility. It also holds true that using a water line system inside the water line system enables far higher flow rates, which also already yields an improved cleaning effect.

In addition, there are major advantages to directly connect a carbon dioxide line system to the passageways under the floor in order to remove carbon dioxide from the barley to be steeped via these passageways. Even though these passageways can in principle relate to passageways other than the passageways used to supply air from the water line system to the barley to be steeped (wherein the dimensions and number of passageways for the carbon dioxide and passageways for the water can deviate from each other, if needed), it is here preferred that the same passageways be used for supplying (and potentially discharging) water that were used to evacuate the carbon dioxide from the barley mass during the dry steeping phase.

In order to limit the necessary tube length for realizing the carbon dioxide line system, the latter is preferably provided under the floor with a number of shared carbon dioxide line elements and carbon dioxide branch line elements between a shared carbon dioxide line element and a passageway. The advantages to a shared carbon dioxide line element and carbon dioxide branch line element are comparable to the application of shared water line elements and water branch line elements.

From the same standpoint, it is further preferred that a number of shared carbon dioxide line elements be connected to a carbon dioxide main line element. Connecting this carbon dioxide main line element to a vacuum source can generate a reduced pressure inside the entire carbon dioxide line system to evacuate the carbon dioxide via the corresponding passageways.

An efficient use of the used line elements is achieved by having the shared water line elements and shared carbon dioxide line elements be formed at least in part by the same shared line elements.

An identical advantage comes into play when the water branch line elements and carbon dioxide branch line elements are formed at least in part by the same branch line elements. The same branch line elements can be used for both supplying (and potentially discharging) water and removing carbon dioxide, since supplying (or discharging) water does not take place simultaneously with carbon dioxide removal.

In order to now prevent carbon dioxide from inadvertently getting into the water main line elements during the use of shared line elements, it is preferred that a water valve be provided between the shared line elements and water main line element.

For a comparable reason, namely to prevent water from penetrating into the carbon dioxide main line element, it is preferred that carbon dioxide valves be provided between the shared line elements and the carbon dioxide main line element.

It is also very much preferred for an air line system to be connected to the passageways under the floor, so that air can be supplied to the barley to be steeped via these passageways. As in the case of the passageways for the carbon dioxide, it also holds true that the passageways for air (or oxygen) can in principle be passageways other than the passageways for passing through water, and hence can also deviate in terms of number and dimensions, but that the passageways intended for supplying air to the barley preferably be the same as the passageways for passing through water and/or the passageways for removing carbon dioxide.

In order to limit the tube length required for realizing the air line system, the air line system is preferably provided with a number of shared air line elements and air branch line elements between a shared air line element and a passageway. In addition, it is preferred within this framework that a number of shared air line elements be connected to an air main line element. Connecting the air main line element to a compressor or the like makes it possible to realize an elevated pressure inside the air line system in order to supply air to the barley to be steeped.

It is preferred that air valves be provided between the shared air line elements and air main line element, so that passageways can be provided in groups for air.

It is here advantageous to provide a control system suitable for the individual or group operation of various air valves.

In order to remove contaminants or the like that circulate on the water in the container, it is preferred that the container be provided near its upper side with a scraper, so that the elements circulating on the water can be scraped off while shifting the scraper in a displacement direction along the surface of the water.

To facilitate the shifting of undesired particles, such contaminants, to the surface of the water in the container, air can be supplied as a stimulus through the air supply passageways. Since the scraper is only effective directly on its front side, another preferred embodiment of the device according to the invention is characterized in that the control system is suitable for opening one or more air valves located in the displacement direction on the front side of the scraper viewed from above.

BRIEF DESCRIPTION OF THE DRAWINGS

The invention will be explained in greater detail based on the description of a preferred embodiment of a steeping device according to the invention drawing reference to the following figures.

DETAILED DESCRIPTION OF THE INVENTION

Figure 1:
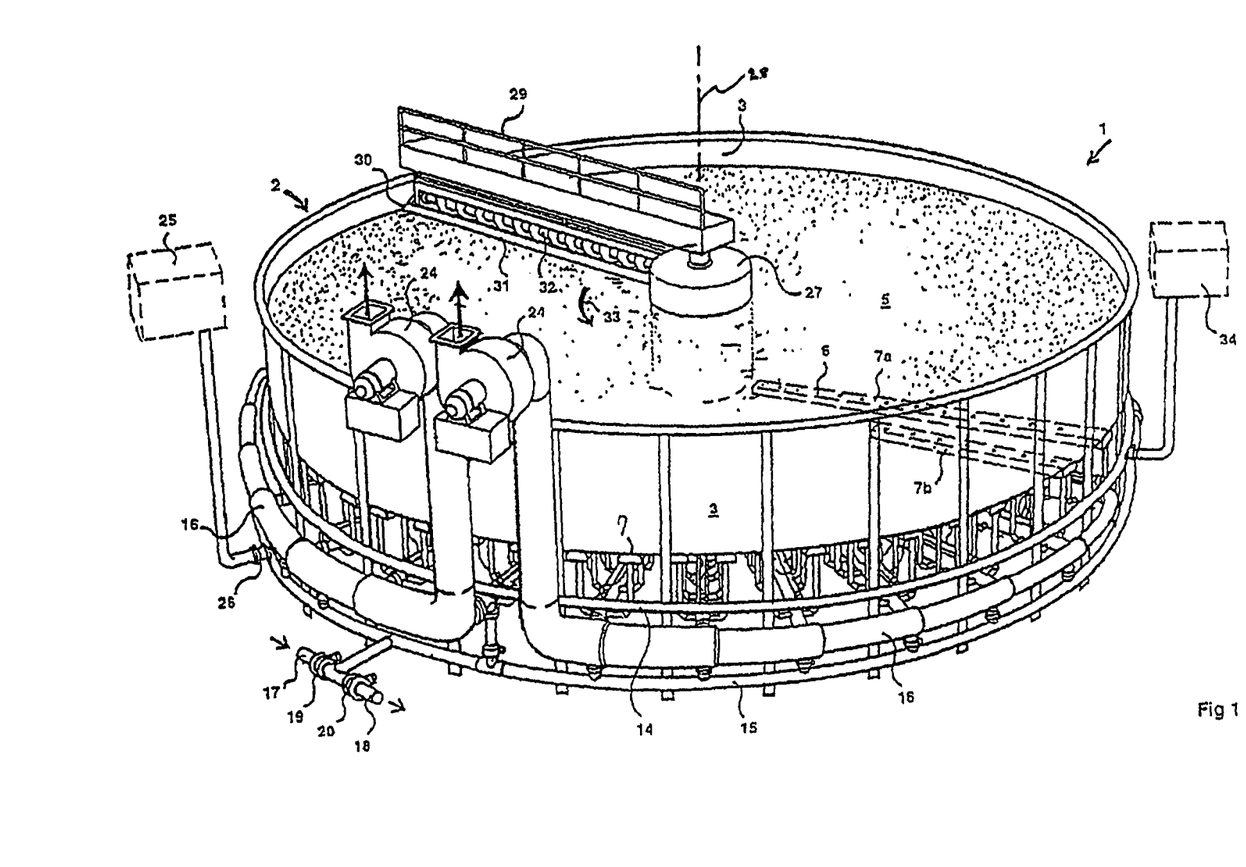
FIG. 1 shows a perspective view of a steeping cistern (partially transparent view)

FIG. 1 shows a steeping cistern 1 for steeping barley for the malting process, e.g., for brewing beer. For example, the steeping cistern 1 can be arranged at the top on a malting tower, which is advantageous from a logistical standpoint, since the steeped barley is subjected to ensuing steps in the malting process after steeping.

The steeping cistern 1 encompasses a container in the form of a cylindrical container 2 with a perpendicular wall 3 and a flat floor 4 abutting the lower side of this perpendicular wall 3 with a diameter of 24 meters. The container 2 is meant to be filled through its open upper side with barley 5 to be steeped, and also to be filled with water during the wet steeping phase.

Located in the middle of the container 2 is a cylindrical support 27 with a central, perpendicular rotational axis 28 for a bridge 29, which extends between the support 27 and the perpendicular wall 3 of the container 2. Connected to the underside of the bridge 29 is a curved scraper body 30 provided with a scraping wall 31 located at the level of the water surface in the container 2 during the wet steeping phase. Situated in the trough of the scraper body 30 is a capstan 32 for removing material, moved by the scraper body 30 from the surface of the water in container 2 in the direction of the support 27. To this end, the support 27 is provided with passageways (not shown in greater detail) for removing the material through the inside of the support 27.

Figure 4:
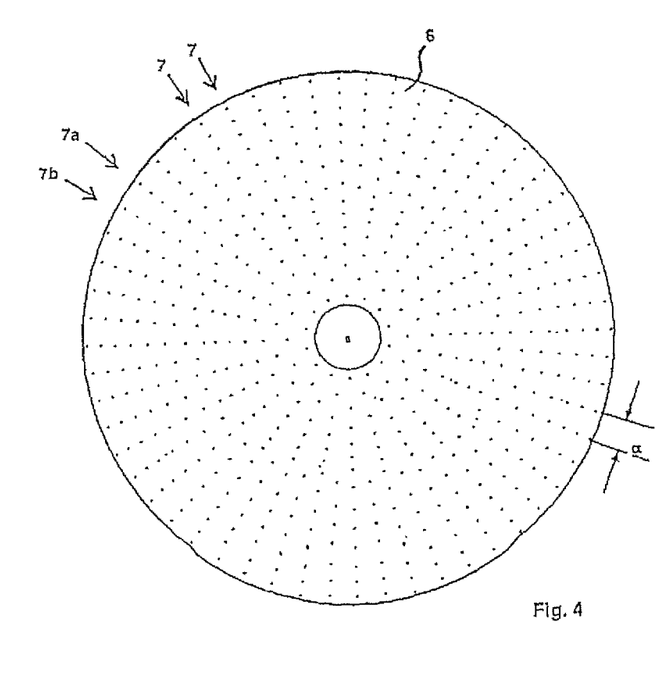
FIG. 4 shows a top view of a possible distribution pattern of passageways on the floor of the steeping cistern according to FIG. 1.

The floor 4 of the container 2 is provided with a number of passageways 6 for passing through agents like water, air/oxygen and carbon dioxide, which play a role in the steeping process. The passageways 6 are arranged in radial rows 7 (FIG. 4), which vary in length. In particular, the long rows 7a extend over nearly the entire radius of the floor 4, and the short rows 7b extend only on the outer half of the radius of the floor 4. The passageways 6 are situated among each other in every radial row 7 spaced roughly the same distance apart. The angle formed by the adjacent rows 7 with each other measures about 6 to 7 degrees. The optimal angle depends on the diameter of the floor. This yields a regular pattern of passageways 6, wherein the distribution of passageways 6 over the surface of the floor 4 is uniform. The density of the passageways 6 averages about 1 passageway per m² of floor area (see, e.g., FIG. 4). Further, the floor 4 can have a partially open gas permeable surface making up less than 5% of the overall surface, and the percentage of open surface can measure less than 3%.

Figure 2:
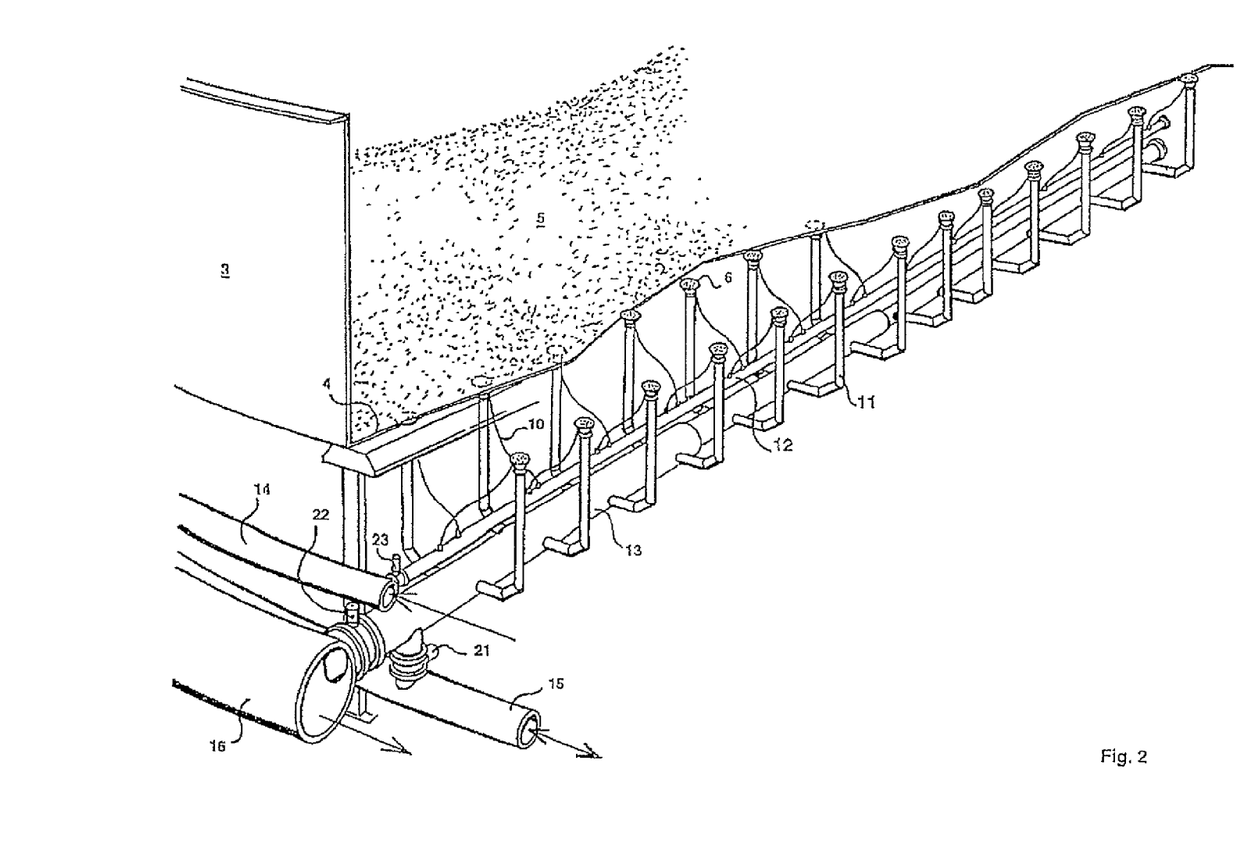
FIG. 2 shows a detailed perspective view of part of the steeping cistern according to FIG. 1.
Figure 3:
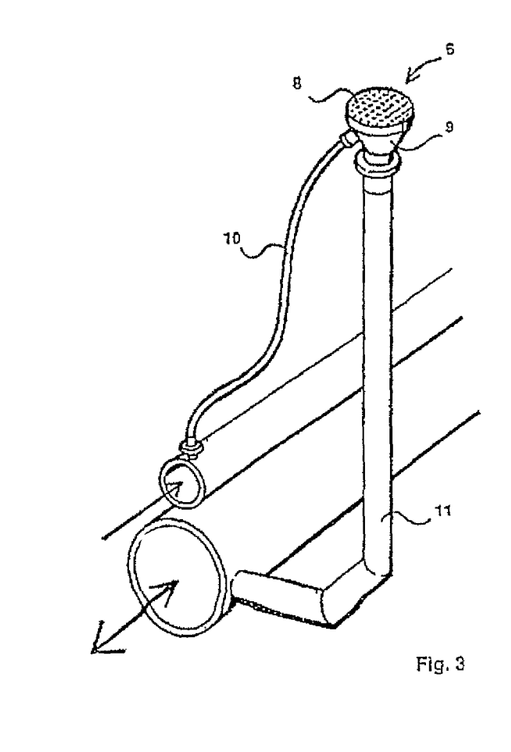
FIG. 3 shows a detailed portion of FIG. 2.

The diameter of each passageway 6 measures about 10 cm. In order to prevent barley grains from passing through the passageways 6, the latter are provided with sieve material 8, as shown in FIG. 3. As illustrated in FIGS. 2 and 3, the passageways 6 are formed from the upper side of a conical accumulator 9 on the inclined lateral wall, from which one air branch line 10 is connected, and to which a combined branch-on line 11 is connected centrally in the middle on the bottom side. On the side opposite the accumulator 9, the air branch line 10 connects to a shared air line 12, to which the air branch lines 10 belonging to other passageways 6 in the same series 7 and an adjacent row 7 are connected. The combined branch lines belonging to the passageways 6 of the same radial rows 7 connect to a shared combined line on their side lying opposite the accumulator 9. In the top view, the various shared air lines 12 and the various shared combined lines 13 are located between two adjacent radial rows 7. Just as the rows 7, the shared air lines 12 and the shared combined lines 13 therefore also extend in a radial direction, wherein the shared air lines 12 are located over the accompanying shared combined lines 13. The diameter of the shared combined lines 13 tapers off toward the middle, so that enough pressure can also be exerted near the middle of the floor when water is supplied to the passageways 6 via the shared combined lines 13.

On the outside of the container 2, the shared air lines 12 connected to an annular air main line element 14, which is hooked up to a compressor 34 to increase the pressure inside the air line system, which consists of the air main line element 14, the shared lines 12 and the air branch lines 10. The air pressure inside the air line system can hence be increased to a pressure exceeding the static pressure owing to the water column (e.g., 0.5 bar or more) in order to supply air to the barley 5 through passageways 6. The air valves 23 between the shared air lines 12 and the air main line element 14 must be open for supplying air.

The outside of the shared combined lines 13 connect with a water main line element 15 or a $CO_2$ main line element 16. As with the air main line element 14, the water main line element 15 is annular, and extends all around the periphery of the container 2 on its bottom side. In the water line system comprised of the water line main line element 15, the shared combined line 13 and the combined branch line 11, water can be supplied via the supply line 17 by opening the water valve 19 and connecting the water valve 20 to the barley 5 via passageways 6, while water can also be discharged via the same water line system from the container 2 through passageways after closing the water valve 19 and opening the water valve 20 via discharge line 18. The water valves 21 between the shared combined lines 13 and the water main line element 15 must here be opened, while the $CO_2$ valves 22 between the shared combined lines 13 and the $CO_2$ main line elements 16 must be closed. The water main line element 15 is connected to a reservoir 25 via cleaning liquid valves 26. The reservoir 25 contains cleaning liquid, e.g., lye, which can be supplied to the water in the water main line element 15 with the cleaning liquid valve 26 open.

A total of four $CO_2$ main line elements 16 are provided, wherein each traverses a quarter circle around the periphery of the container 2. The $CO_2$ main line elements 16 have an increasing diameter, wherein a vacuum pump 24 is provided on the side of the largest diameter (see FIG. 1). The action of the fans 24 makes it possible to remove $CO_2$ from the barley via the carbon dioxide line system consisting of the four carbon dioxide main line elements 16, the shared combined lines 13 and the combined branch lines 11.

The arrangement of passageways 6 in the sieve material 8 of the floor 4 is preferably optimized via flow simulation.

The passageways 6 are arranged in rows 7 (and 7a, 7b) in the exemplary embodiment, wherein these rows are simultaneously designed as a support for the floor 4, and discharge the floor load.

The passageways 6 could also be arranged between the rows 7, however.

The $CO_2$ main line element 16 can be arranged as shown on FIG. 1, or closer to the floor 4 or at the upper edge of the container 2.

In addition to evacuating $CO_2$ from the barley 5 via the passageways 6 or accumulators 9, compressed air can also be introduced into the barley 5 via the air branch line 10. To this end, each line connection is provided with a check valve between the air branch line 10 and accumulator 9 (not explicitly shown) to prevent water from penetrating. This improves sanitation.

Air branch lines 10 and branch-in lines 11 are preferably flexible or elastic in design.

The accumulators 9 constitute part of the floor 5, and preferably lased like the holes in the sieve jacket.

The combined lines 13 form an inlet and outlet, while the main line is only used as an inlet for the air branch lines 10.

The floor 4 and sieve material 8 in the example are designed in such a way that gridirons are arranged between the rows 7, 7a, 7b, and the floor abuts the rows 7, 7a, 7b as a perforated plate with the sieve openings.

The steeping cistern 1 functions as follows: Starting from an unfilled state of the container 2, the barley 5 is introduced into the container 2. Water is then supplied via the water line system to the barley 5 through the passageways 6, so that the barley 5 is completely immersed in the water. This state of the wet steeping phase is retained for several hours, for example two or three hours. Because the passageways 6 are arranged in radial rows 7 and separate air valves 23 that can be individually opened and closed by a control system (not shown in any greater detail) are used per row, it is possible during the wet steeping phase to selectively provide rows 7 with air during the rotation of the scraper body 30 in a rotational direction 33 directly preceding the scraper body 30 with viewed from above, so that dirt there floats up locally to more of an extent, and can be removed via the scraping wall 31 through the capstan 32.

After the steeping phase, the water is again allowed to drain from the container 2 via passageways 6 by opening the water valve 20. The barley 5 then allowed to dry to more or less of an extent during the so-called dry steeping phase. During this dry steeping phase, which lasts five hours, for example, the barley grains swell and respire faster, to which end the barley grains absorb oxygen, and the barley grains release $CO_2$. In order to keep this process going, oxygen is supplied to the barley as part of the air via the oxygen line system, while the $CO_2$ is evacuated from the barley through fans 24 with the $CO_2$ valves 22 open and water valves 21 closed. The combined branch lines 11 and shared, combined lines 13 are here both used for supplying and discharging water, and for evacuating $CO_2$. The wet steeping phase and dry steeping phase described above can alternate a few times until steeping has reached a sufficient level, and the steeped barley is suitable for the malting process.

For cleaning the steeping cistern 1, and above all for cleaning the water line system, this water line system can be rinsed thoroughly with water provided with cleaning liquid from the reservoir 25. The type of line system here enables the realization of relatively high flow rates for the cleaning liquid, so that cleaning can take place effectively, while the necessary quantity of cleaning liquid remains limited due to the restricted quantity relative to the water line system. The expert will know that the passageways 6 and primarily their sieve materials 8 and the floor 4 can be exposed to the action of the cleaning liquid in this way, wherein only a thin layer of cleaning liquid has to be applied to the floor 4 to this end. The cleaning efficiency can be further increased significantly by aerating the cleaning liquid, which imparts motion to the cleaning liquid.

REFERENCE LIST

1 Steeping cistern
2 Container
3 Wall
4 Floor
5 Barley
6 Passageway
7 Row
7a Long row
7b Short row
8 Sieve material
9 Accumulator
10 Air branch line
11 Branch-in line
12 Air line
13 Combined line
14 Air main line element
15 Water main line element
16 CO2 main line element
17 Supply line
18 Discharge line
19 Water valve
20 Water valve
21 Water valve
22 CO2 valve
23 Air valve
24 Vacuum pump
25 Reservoir
26 Cleaning liquid valve
27 Support
28 Rotational axis
29 Bridge
30 Scraper body
31 Scraping wall
32 Capstan
33 Rotational direction

The invention claimed is:

1. A device for steeping barley, comprising:
   a steeping container structured and arranged for steeping barley having a container floor structured and arranged for supporting the barley;
   passageways formed in the container floor that are structured and arranged for passing at least steeping water; and
   a water line system located outside of the steeping container and under the container floor being directly connected to the passageways in the container floor,
   wherein the water line system is structured to directly discharge water from the steeping container through the passageways in the container floor, and wherein the water line system is structured to supply water to the steeping container through the passageways, and
   wherein the passageways are provided with sieve material to prevent barley grains from passing through the passageway;

a CO2 line system located under the container bottom floor being connected directly to the passageways for removing CO2 from the container, wherein the CO2 line system comprises:
   shared CO2 line elements; and
   CO2 branch line elements arranged to couple the passageways to the shared CO2 line elements;
a CO2 main line element, wherein the shared CO2 line elements are connected to the CO2 main line element;
the water line system further comprises:
   shared water line elements; and
   water branch line elements arranged to a couple the passageways to the shared water line elements; and
common shared line elements formed a least in part by the shared water line elements and the shared CO2 line elements.

2. The device according to claim 1, wherein the passageways include sieves.

3. The device according to claim 1, wherein the container has a round shape when viewed from above, and wherein the passageways are arranged in radially oriented rows.

4. The device according to claim 3, wherein adjacent radially oriented rows having varied lengths.

5. The device according to claim 1, wherein the water line system comprises:
   shared water line elements; and
   water branch line elements arranged to couple the passageways to the shared water line elements.

6. The device according to claim 5, wherein the shared water line elements are radially oriented.

7. The device according to claim 5, wherein the shared water line elements are oriented between two adjacent, radially oriented rows of passageways when viewed from above.

8. The device according to claim 5, further comprising a water line main element, wherein the shared water line elements are connected to the water main line element.

9. The device according to claim 1, further comprising:
   a reservoir for cleaning agents; and
   a cleaning agent valve connecting the reservoir with the water line system to supply cleaning agent to the water line system.

10. The device according to claim 1, further comprising common branch line elements, wherein the water branch line elements and the $CO_2$ branch line elements are formed at least in part by the common branch line elements.

11. The device according to claim 1, further comprising water valves between the common shared line elements and the water main line element.

12. The device according to claim 1, further comprising $CO_2$ valves between the common shared line elements and the $CO_2$ main line element.

13. The device according to claim 1, further comprising:
   an air line system connected under the floor to the passageways for passing air to the container.

14. The device according to claim 13, wherein the air line system further comprises:
   shared air line elements; and
   air branch line elements arranged to couple the passageways to the shared air line elements.

15. The device according to claim 14, wherein the shared air line elements and the air branch line elements are located under the floor.

16. The device according to claim 14, further comprising an air main line element, wherein the shared air line elements are connected to the air main line element.

17. The device according to claim 16, further comprising air valves between the shared air line elements and the air main line element.

18. The device according to claim 17, further comprising a control system for controlling individual or group operation of the air valves.

19. The device according to claim 18, wherein the container further comprises:
   a scraper body, positionable near an upper side of the container, structured and arranged to shift in a displacement direction along a surface of the water to one of scrape and collect elements circulating on a surface of the water.

20. The device according to claim 19, wherein as the scraper body shifts in a displacement direction along the surface of the water, the control system opens at least one of the air valves directly preceding a front side of the scraper body when viewed from above in the displacement direction.

21. The device according to claim 1, wherein the container floor has a partially open, gas-permeable surface making up less than 5% of an overall container floor surface.

22. The device according to claim 1, wherein the container floor has a partially open, gas-permeable surface making up less than 3% of an overall container floor surface.

23. The device according to claim 1, wherein the water and $CO_2$ line systems have a stepped increase in diameter.

24. The device according to claim 13, wherein the water and air line systems have a stepped increase in diameter.

25. The device according to claim 1, wherein the water and $CO_2$ line systems are routed to outside the container.

26. The device according to claim 13, wherein the water and air line systems are routed to outside the container.

27. A method for steeping barley, comprising:
at least one of:
   passing water through passageways formed in a steeping container floor of a steeping container, the steeping container floor being structured and arranged to support barley during steeping, and
   passing gas through the passageways formed in the container floor,
wherein a water and gas supply line system is located outside of the container and under the container floor is directly connected to the passageways formed in the steeping container floor,
wherein the water is directly discharged from the steeping container through the passageways in the steeping container floor,
wherein the water is directly supplied to the steeping container through the passageways during steeping,
wherein the passageways are provided with the sieve material to prevent barely grains from passing through the passageway; and
wherein the water and gas supply line system includes:
   a CO2 line system located under the container bottom floor that is connected directly to the passageways for removing CO2 from the container, the CO2 line system comprising shared CO2 line elements and CO2 branch line elements arranged to couple the passageways to the shared CO2 line elements;
   a CO2 main line element to which the shared CO2 line elements are connected;
   shared water line elements;
   water branch line elements arranged to couple the passageways to the shared water line elements; and common shared line elements formed at least in part by the shared water line elements and the shared CO2 line elements.

* * * * *